(12) United States Patent
Lakawicz et al.

(10) Patent No.: US 11,911,798 B2
(45) Date of Patent: Feb. 27, 2024

(54) MATERIAL HANDLING APPARATUS WITH ITEM SCANNING STATION

(71) Applicant: OPEX Corporation, Moorestown, NJ (US)

(72) Inventors: Joseph Lakawicz, Moorestown, NJ (US); Stuart Ligo, Moorestown, NJ (US); Monty McVaugh, Moorestown, NJ (US); Scott Ferguson, Moorestown, NJ (US)

( * ) Notice: Subject to any disclaimer, the term of this patent is extended or adjusted under 35 U.S.C. 154(b) by 0 days.

(21) Appl. No.: 18/206,507

(22) Filed: Jun. 6, 2023

(65) Prior Publication Data

US 2023/0390806 A1   Dec. 7, 2023

Related U.S. Application Data

(60) Provisional application No. 63/349,587, filed on Jun. 6, 2022.

(51) Int. Cl.
*B07C 3/08* (2006.01)
*B07C 3/12* (2006.01)
*B07C 3/00* (2006.01)

(52) U.S. Cl.
CPC ............... *B07C 3/08* (2013.01); *B07C 3/008* (2013.01); *B07C 3/12* (2013.01); *B07C 2301/0016* (2013.01)

(58) Field of Classification Search
CPC .. B07C 3/08; B07C 3/008; B07C 3/12; B07C 2301/0016
See application file for complete search history.

(56) References Cited

U.S. PATENT DOCUMENTS

| | | | |
|---|---|---|---|
| 7,861,844 B2 * | 1/2011 | Hayduchok | B61C 11/04 198/370.1 |
| 8,104,601 B2 | 1/2012 | Hayduchok | |
| 8,276,740 B2 | 10/2012 | Hayduchok | |
| 8,622,194 B2 | 1/2014 | DeWitt | |
| 8,695,790 B2 * | 4/2014 | Ridgell | F16G 3/02 198/844.2 |
| 9,010,517 B2 | 4/2015 | Hayduchok | |
| 9,687,883 B2 | 6/2017 | Hayduchok | |
| 10,052,661 B2 | 8/2018 | Hayduchok | |
| 10,494,192 B2 * | 12/2019 | DeWitt | B65G 43/08 |
| 10,576,505 B2 | 3/2020 | Hayduchok | |
| 10,639,678 B2 * | 5/2020 | Cherry | B07C 5/3422 |
| 10,766,712 B2 | 9/2020 | DeWitt | |
| 10,783,339 B2 * | 9/2020 | Markman | G06K 7/10415 |
| 10,865,053 B2 | 12/2020 | DeWitt | |
| 11,014,744 B2 | 5/2021 | Muttathil | |
| 11,192,144 B2 | 12/2021 | Hayduchok | |
| 11,358,175 B2 | 6/2022 | Hayduchok | |
| 11,478,825 B2 | 10/2022 | Hayduchok | |
| 11,512,762 B2 | 11/2022 | O'Mara | |

* cited by examiner

*Primary Examiner* — Patrick H Mackey
(74) *Attorney, Agent, or Firm* — Brian Dinicola (57) ABSTRACT

A method and apparatus are provided for delivering items to a plurality of storage locations. The items are fed into the apparatus at an input station having a scanning station. The scanning station evaluates one or more characteristics of each item. The items are then loaded onto a delivery mechanism that delivers the items to storage locations. Once at the appropriate storage location, the delivery mechanism discharges the item to the storage location and returns to receive another item to be delivered.

25 Claims, 6 Drawing Sheets

MATERIAL HANDLING APPARATUS WITH ITEM SCANNING STATION

RELATED APPLICATIONS

This application claims priority under 35 U.S.C. § 119 to U.S. Provisional Patent Application No. 63/349,587 filed Jun. 6, 2022. The entire disclosure of the foregoing application is hereby incorporated herein by reference.

FIELD OF THE INVENTION

The present invention relates to a material handling system and in particular to a system operable to receive and sort items using a plurality of automated vehicles. The system may include a station for scanning items to identify a characteristic of the items being sorted.

BACKGROUND OF THE INVENTION

Sorting and retrieving items to fill a customer order can be a laborious and time consuming. Many large organizations have extensive storage areas in which numerous items are stored. Sorting and retrieving items from the hundreds or thousands of storage areas requires significant labor to perform manually. In many fields, automated picking has developed to reduce labor cost and improve customer service by reducing the time it takes to fill a customer order.

In many automated material handling systems, the throughput of the material handling system is determined, among other things, by the rate at which each object is accurately identified and fed into the system. One of the issues that may arise is differentiating pieces as the feed rate increases. Accordingly, it is desirable to provide a system for accurately reading items to be sorted at a high rate, while also differentiating adjacent pieces in the workflow.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The invention provides a number of aspects that may form part of a material handling system. The system may include one or more of a number of aspects of the invention as further described below.

According to one aspect, the invention may provide an apparatus for sorting a plurality of items is provided. The apparatus includes a plurality of sort destinations and a plurality of a plurality of delivery vehicles for delivering items to the sort destinations. A controller provides control signals for controlling the operation of the vehicles.

According to another aspect, the invention may comprise a track system for guiding the delivery vehicles to the sort destinations.

According to another aspect, the invention may comprise a scanner for scanning an item to detect a characteristic of each item, wherein the detected characteristic is the characteristic determined for an item that the controller uses to identify the sort destination to which the item is to be sorted.

According to another aspect of the invention a method is provided for sorting a plurality of items. The method may include the step of loading an item onto a vehicle to be delivered to an output bin and driving the vehicle to the output bin. The method may further include the steps of discharging the item from the vehicle into the output bin and monitoring the position of the item on the vehicle.

In another aspect, the invention provides an apparatus for sorting a plurality of items that includes a plurality of delivery vehicles guided by a track to deliver items to one or more destination. The apparatus may include a loading station for loading items onto the vehicles. The items may be analyzed to detect a first characteristic before the items are loaded onto a vehicle. A recirculation system may be provided for recirculating items to an input station from a point along the track.

According to another aspect, a method is provided for delivering items to one or more destinations. The method may include the step conveying an item past a first conductive wall. The first conductive wall separates a first conveyor section from a second conveyor section. When the item is conveyed past the first conductive wall, the item may be conveyed under the first wall or through an opening in the first conductive wall. An RFID scanner scans an RFID tag on the first item on the second conveyor section while the first item is supported on a non-conductive support. A destination for the first item may be determined based on the step of scanning the RFID tag.

The method optionally includes the step of conveying the first item past a second conductive wall separating the second conveyor section from a third conveyor section. When the item is conveyed past the second conductive wall, the item may be conveyed under the second wall or through an opening in the second conductive wall.

The method may include the step of loading the item from the third conveyor section onto a delivery mechanism. The delivery mechanism may be displaced to deliver the item to the determined destination. After the delivery mechanism is displaced to the determined destination, the item may be discharged into the delivery destination.

According to another aspect, the system includes a material handling apparatus that includes an input station having a conveyor and a scanning station. The conveyor may include a first segment for receiving items, a second segment for receiving items from the first segment and a third segment for receiving items from the second segment. The second segment may include a non-conductive element for supporting items on the second segment.

The scanning station may be configured to scan items on the second segment of the conveyor. Optionally, the scanning station may include one or more conductive walls along the second segment and an RFID scanner. For instance, the scanning station may include a first conductive wall extending across the conveyor to separate from the first segment from the segment. Similarly, the scanning station may include a second conductive wall extending across the conveyor to separate the second segment from the third segment.

The system may also include a delivery mechanism for receiving one of the items from the third segment of the conveyor and delivering the item to a storage location. Optionally, the system also includes a central controller operable to receive information from the scanning station regarding an identification for the item scanned in the scanning station. Based on the scanned information, the central controller may be configured to determine the storage location for the item. Optionally, the central controller provides controls signals to the delivery mechanism to deliver the item to the determined storage location.

In yet another embodiment, the system may include a conveyor and a delivery mechanism for delivering items from the conveyor to a storage location. An RFID scanner may scan RFID tags on the items as the items are conveyed toward the delivery mechanism. The system may include a housing positioned along the conveyor. Optionally, the housing includes a first wall extending across a width of the conveyor and configured to allow items on the conveyor to pass from an input location to a scanning area. The first wall is preferably formed of a conductive material. The housing may include a second wall extending across a width of the conveyor and spaced apart from the first wall so that the scanning area is between the first wall and the second wall. Optionally, the second wall is configured to allow items on the conveyor to pass from the scanning area to a loading location. Preferably, the second wall is formed of a conductive material.

The conveyor of the system may be configured so that in the scanning area the item is supported on a moveable surface for moving the item through the scanning area. The system may include a fixed support surface for supporting the moveable surface. Preferably, the moveable surface and fixed support surface are formed from non-conductive materials.

In one embodiment, the system may include a conveyor having an input area configured so that an item in the input area is supported on the moveable surface and a fixed support surface supporting the moveable surface. The fixed support may be formed of any of a variety of materials, but preferably the support surface is formed of a conductive material, such as metal.

Similarly, the system may include a conveyor having an output area configured so that an item in the output area is supported on the moveable surface and a fixed support surface supporting the moveable surface. The fixed support may be formed of any of a variety of materials, but preferably the support surface is formed of a conductive material, such as metal.

The system may include a central controller configured to operate the RFID scanner to scan an item while the item is between the first and second conductive walls and the item is on the non-conductive fixed support.

BRIEF DESCRIPTION OF THE DRAWINGS

The foregoing summary and the following detailed description of the preferred embodiments of the present invention will be best understood when read in conjunction with the appended drawings, in which the same reference numbers will be used throughout the drawings to refer to the same or like parts.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. Therefore, in the context of this specification, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

Figure 1:
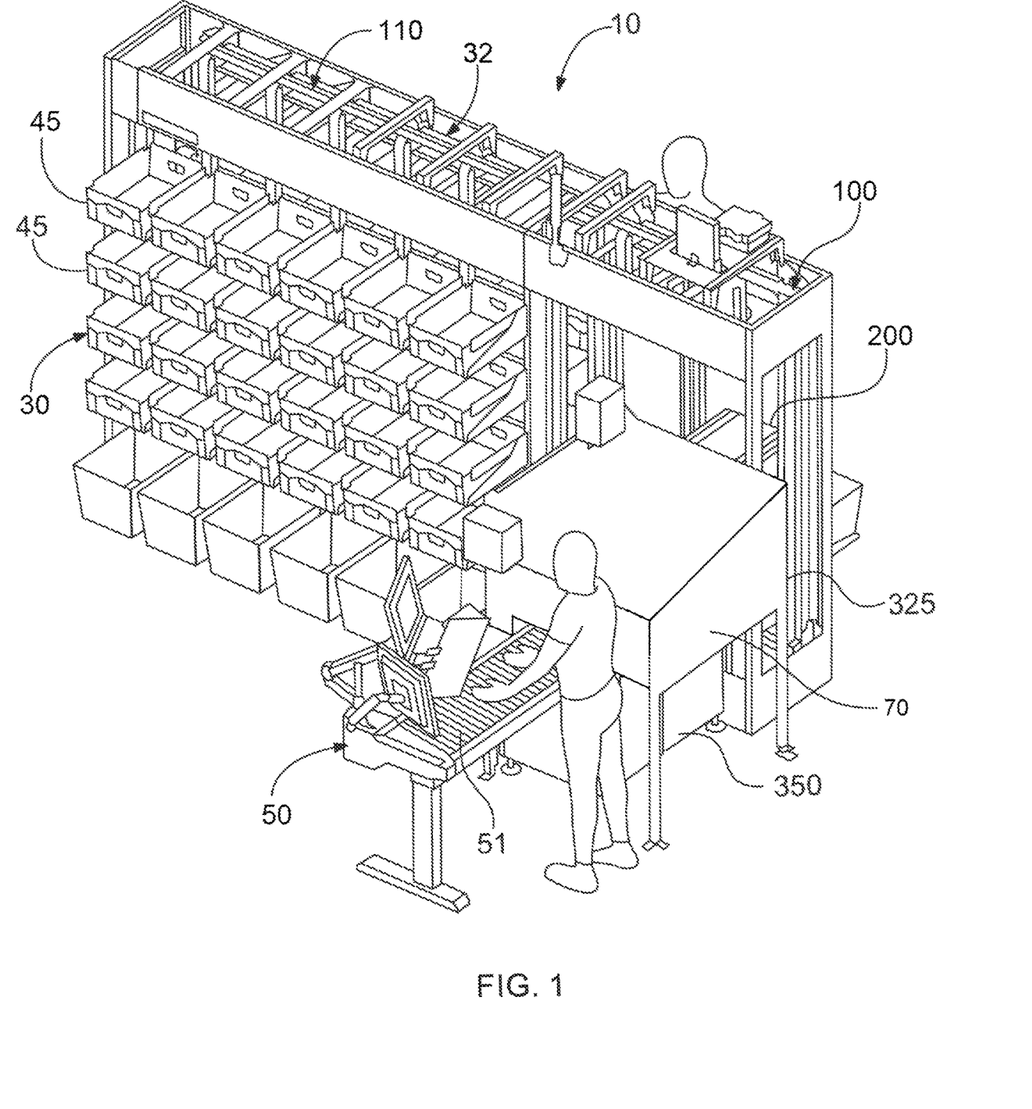
FIG. 1 is a perspective view of a material handling apparatus incorporating aspects of the present invention.
Figure 2:
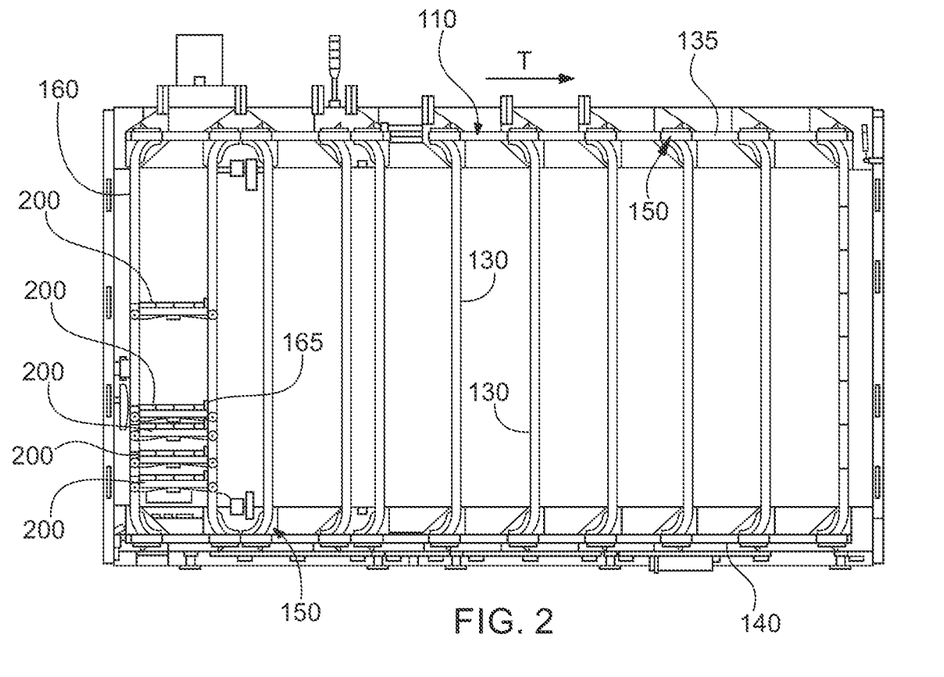
FIG. 2 is a side view of a track of the material handling apparatus illustrated in FIG. 1
Figure 3:
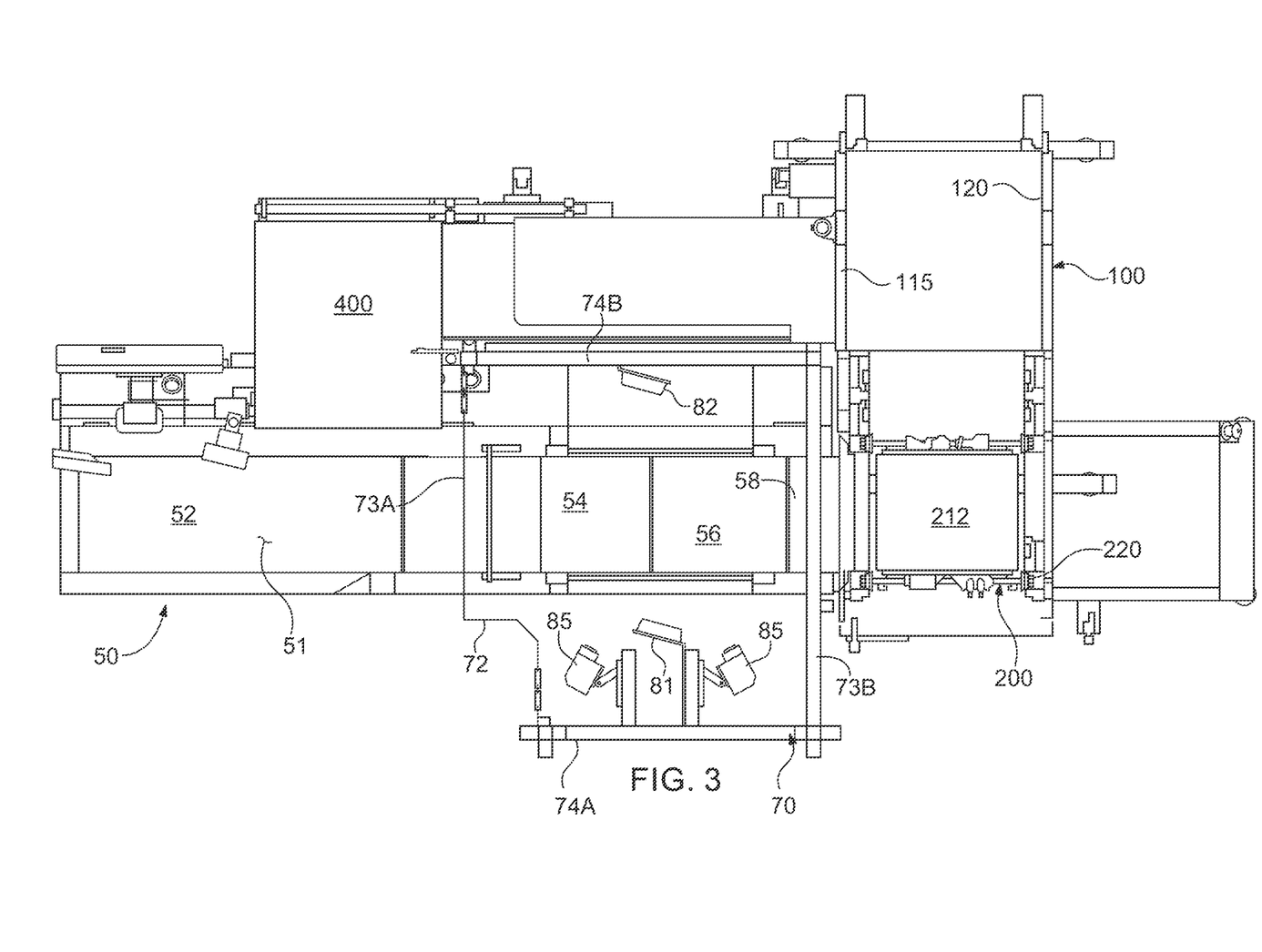
FIG. 3 is a plan view partially broken away of the material handling apparatus illustrated in FIG. 1.

Referring now to FIGS. 1-3, an apparatus for sorting items is designated generally 10. The apparatus 10 includes a plurality of delivery vehicles 200 that travel along a track system 100 to deliver items to a plurality of destinations or sort locations, such as output bins 45. Items are loaded onto the vehicles at a loading station 165 where each vehicle receives an item to be delivered to one of the bins 45. An inductions station 50 serially feeds items to the loading station 165. The induction station 50 may include one or more scanning elements for detecting one or more characteristics of the item.

From the loading station 165, the vehicles 200 travel along a track 110 to the destinations. The track may include a horizontal upper rail 135 and a horizontal lower rail 140, which operates as a return leg. A number of parallel vertical track legs 130 may extend between the upper rail and the lower return leg. The bins 45 may be arranged in columns between the vertical track legs 130. Alternatively, the bins may be arranged in a plurality of rows between the vertical track legs.

The vehicles 200 are semi-autonomous vehicles that may have an onboard power source and an onboard motor to drive the vehicles along the track 110. The vehicles may include a loading/unloading mechanism, such as a conveyor 212, for loading pieces onto the vehicles and discharging the pieces from the vehicles.

Since the system 10 includes a number of vehicles 200, the positioning of the vehicles is controlled to ensure that the different vehicles do not crash into each other. In one embodiment, the system 10 uses a central controller 350 that tracks the position of each vehicle 200 and provides control signals to each vehicle to control the progress of the vehicles along the track. The central controller 350 may also control operation of the various elements along the track, such as gates 150 that re-direct the vehicles from a horizontal direction of travel to a vertical direction of travel or vice versa.

Induction Station

At the induction station 50, items are inducted into the system by serially loading items onto the vehicles 200. In one embodiment, each item is scanned at the induction station to detect one or more features of the item. Those features are used to ascertain the identification of the item. Once the item is identified, various characteristics of the item may be retrieved from a central database and the item may be subsequently processed based on the known characteristics of the item. For instance, the induction station 50 may include a scanning station 80 that scans for a product code, such as a bar code. Once the product code is determined, the system retrieves information regarding the product from a central database. This information is then used to control the further processing of the item as discussed further below.

As shown in FIGS. 1 and 3-6, the induction station 50 may include a scanning station 70 for automatically detecting characteristics of the items. Specifically, the induction station 70 may include an input conveyor 52 for receiving items and conveying the items to the scanning station 70 operable to detect one or more physical characteristics of an item. From the scanning station 70, a loading conveyor 58 conveys the item to the loading station 165 where the item is either loaded onto one of the vehicles 200 or passed through to a reject bin 325.

The input conveyor 52 may be any of a variety of conveying devices designed to convey items. In particular, the input conveyor may be designed to receive items dropped onto the conveyor. For instance, the input conveyor 52 may be a horizontal conveyor belt or a horizontal roller bed formed of a plurality of generally horizontal rollers that are driven, thereby advancing items along the conveyor away from the roller.

The input conveyor 52 may be configured so that an operator can select an item from a supply of items located adjacent the input conveyor. For example, a separate supply conveyor may convey a steady stream of items to the induction station 50. The operator may continuously select an item from the supply conveyor and drop the items onto the input conveyor 52. Alternatively, a large container of items may be placed adjacent the input conveyor 52, such as a bin or other container. The operator may select items one at a time from the supply bin and place each item onto the input conveyor. Still further, the input conveyor 52 may cooperate with a supply assembly that serially feeds items onto the input conveyor. For example, a supply conveyor may convey a continuous stream of items toward the input conveyor 52. The input conveyor may include a sensor for sensing when an item is conveyed away from the input conveyor. In response, the system may control the operation of both the supply conveyor and the input conveyor 52 to drive an item forwardly from the supply conveyor onto the input conveyor. In this way, items may be fed onto the input conveyor either manually by the operator or automatically by a separate feed mechanism operable to feed items to the input conveyor.

Before being loaded onto a vehicle for delivery or sorting, the induction station may include a scanning station 70 for detecting one or more characteristics of each item.

Various factors may be detected to evaluate how an item is to be processed. For instance, an item typically needs to be identified so that the system can determine the location or bin to which the item is to be delivered. This is normally done by determining the unique product code for the item. The system may include a scanning element for scanning a product identification marking on the product. By way of example, the items may be marked with one or more of a variety of markings, including, but not limited to, machine-readable optical labels, such as bar codes (e.g., QR or UPC codes), printed alphanumeric characters or a unique graphic identifier. The scanning station 70 may include a scanner or reader for reading such a marking. For instance, a bar code reader, optical reader or RFID reader may be provided to scan the item to read the identification marking.

Once the product identification marking is determined (either manually or automatically), the system retrieves information regarding the product and then controls the further processing of the item based on the information stored in the central database.

From the foregoing, it can be seen that a variety of different input mechanisms may be utilized to attempt to determine a product identification marking on an item. In the present instance, the scanning system 70 includes one or more optical readers operable to scan items to obtain optical image data of the item. The system then processes the optical image data to detect the presence of a product identification marking. If a product identification marking is detected, the system analyzes the marking to determine the product identification number or code.

Figure 4:
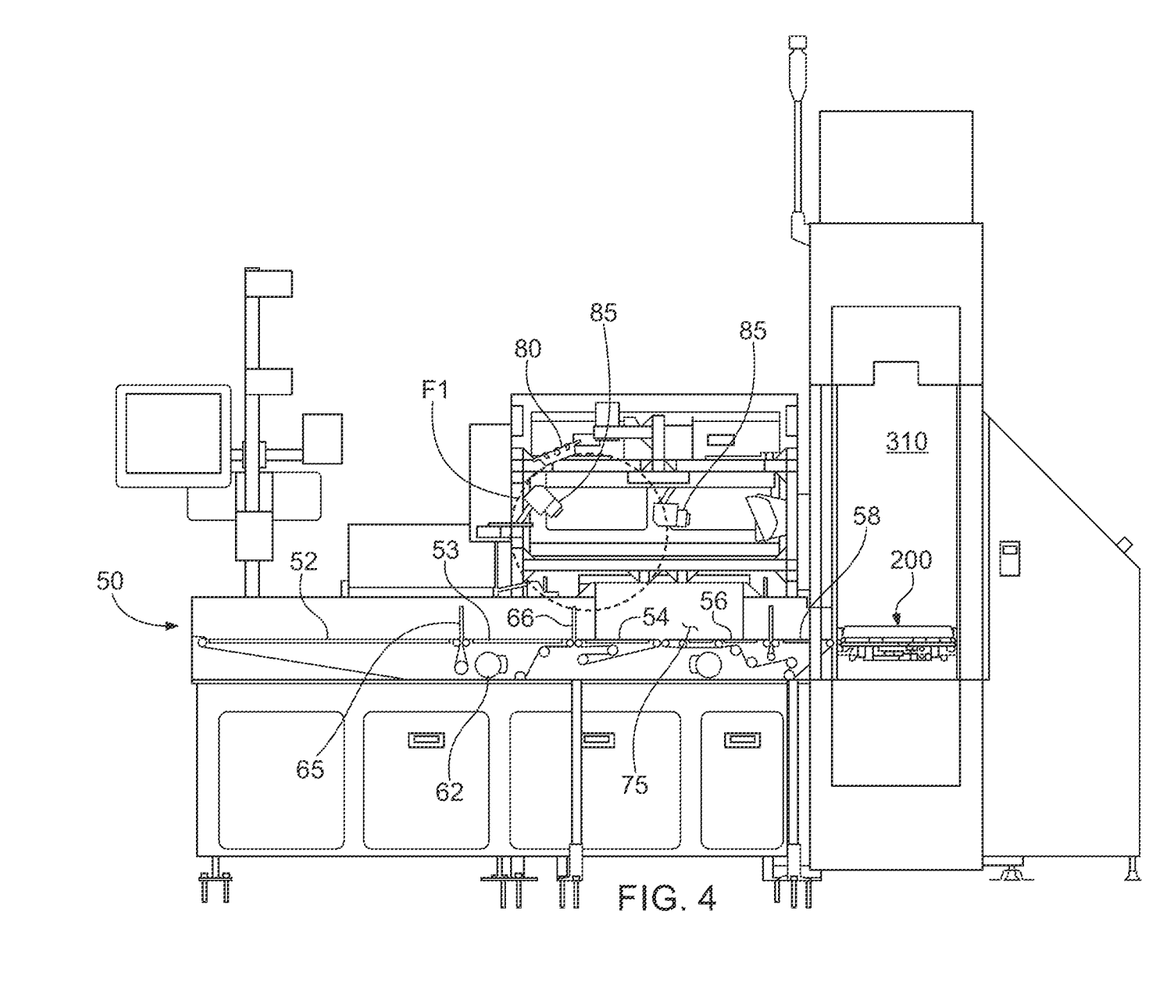
FIG. 4 is a side view partially broken away of the material handling apparatus illustrated in FIG. 1.

For example, as shown in the embodiments in FIGS. 1-2 and 4, the scanning station 70 may include a plurality of scanning elements 85 positioned along the feed conveyor 70. The imaging elements are spaced apart from one another and disposed around the feed conveyor so that the scanning elements can scan the entire item as the item is conveyed toward the loading station 165. Specifically, the scanning station 80 includes one or more cameras 85 directed along a horizontal axis to scan the front and back sides of the item. In particular, the scanning station may include a plurality of imaging elements 85 positioned along a front edge of the feed conveyor and a plurality of imaging elements positioned along a rearward edge of the feed conveyor. Additionally, the scanning station 80 may include one or more cameras 85 directed along a vertical axis to scan the top of the item as the item is conveyed along the feed conveyor 70. Further still, additional imaging elements may be provided to scan the leading and trailing faces of an item as the feed conveyor 70 conveys the item. Additionally, the feed conveyor 70 may include a gap between adjacent conveyors. The items may be conveyed over the gap and a camera below the conveyor may scan the items through the gap so that the bottom surface of the items can be scanned by the detection station. In this way, the scanning station may include an array of sensors, reading elements, scanning elements or detectors positioned around a path of movement so that the scanning station can automatically scan an item for an identification mark while the item is conveyed along the path.

As described above, the scanning station 80 may analyze each item to attempt to find a product identification marking to identify the item based on the marking. If the product identifier is determined the system may then determine the destination for the item and the item may be electronically tagged as qualified for sorting. Similarly, parameters for how the item should be handled by the vehicle may also be determined based information for the product code stored in a database. Conversely, if the product identifier is not determined for an item, then the item may be electronically tagged as not qualified for sorting.

In addition to the scanning cameras 85, the scanning station may include a scanning element that does not require line of sight to read a tag or identifying element. For instance, the scanning station may include a scanning element that is able to scan through the items to identify the identifying characteristic of the item. One exemplary scanning element that can scan through an item rather than requiring line of sight, is a radio frequency identification scanner or RFID scanner. The scanning station may include a single RFID scanner 80 to scan items as the items pass through the scanning station 70. The system may simultaneously scan the items using scan cameras and compare the scanned information from the scanning cameras and the RFID reader to confirm the identification characteristic (such as the product code number) for an item. Alternatively, the scanning cameras can be used to scan items that do not have RFID tags and the RFID scanner 80 can be used to identify items that have RFID tags attached. Additionally, although the scanning station is illustrated with both RFID scanners 80 and cameras 85, the cameras may be eliminated in applications in which all of the items being processed will have an RFID tag.

Referring to FIGS. 3-6, in the present instance, the scanning station 70 includes a plurality of RFID readers. Specifically, the scanning station includes an overhead RFID reader 80 positioned vertically above the scanning area 75 to direct a scan field F1 downwardly toward items in the scanning area. Optionally, the system may also include a front RFID reader 81 positioned adjacent the front edge of the scanning area 75 to direct a scan field F2 across the scan area from the front of the scanning station. Optionally, the system may also include a rear RFID reader 82 positioned adjacent the rear edge of the scanning area 75 to direct a scan field F3 across the scan area from the rear of the scanning station.

The RFID reader 80 may be any of a variety of readers that include an antenna for transmitting a signal toward the scan area 75 and for receiving a signal back from an RFID tag in the scan area. In the present instance, all of the RFID readers 80, 81, 82 are configured the same. One exemplary RFID reader is sold by the SICK Product and Competence Center Americas, LLC of Minneapolis Minnesota under the product number RFU62x.

The induction station 50 includes a plurality of conveyors configured to convey items from an input area to a loading area where items are loaded onto the vehicles. In the present instance, the induction station includes an input conveyor 52 positioned at the lefthand most end of the induction station (when viewed from FIGS. 3, 4 and 6). The input conveyor 52 is configured to receive and support items dropped on the input conveyor and to convey the items toward the scan area 75. The input conveyor may comprise any of a number of configurations. In the present instance, the input conveyor comprises an endless conveyor entrained around a plurality of rollers. A motor 62 drives the input conveyor 52 in response to signals from a central controller 350. The input conveyor 52 is positioned adjacent a scan entry conveyor 54 that receives items from the input conveyor and conveys the items from the input area into the scan area 75. In particular, the discharge end of the input conveyor may be positioned outside of the scanning station 70 so that the input conveyor conveys the items toward the entrance of the scanning station but not into the scanning station.

The scan entry conveyor 54 may extend from the input conveyor 52 to the loading station so that the scan entry conveyor conveys the items from the input conveyor through the entire length of the scanning station. However, in the present instance the system may include a plurality of conveyors that convey items from the input conveyor 52 to the loading station 165. For instance, the system may include a scan exit conveyor 56 that receives items from the scan entry conveyor and conveys items toward the loading station 165. A gap 60 may be formed between the scan entry 54 conveyor and the scan exit conveyor 56. The gap 60 is a space through which the camera below the conveyors can read the bottom side of the items. Additionally, the gap provides an opening through which the Fields F1, F2, F3 can pass through the item in the scan area without interference from an element supporting the item being conveyed.

The system may also include a loading conveyor 58 that receives items from the scan discharge conveyor 56. The loading conveyor is operable to load items onto a vehicle positioned in the loading station 165 as illustrated in FIG. 4.

The scan entry conveyor 54, scan exit conveyor 56 and loading conveyor may be configured in a variety of configurations. In the present instance, each of these conveyors comprise an endless conveyor belt entrained around a plurality of rollers. Additionally, each of the scan entry 54, scan exit, 56 and loading conveyor 58 may be driven independently. However, in the present instance, a motor 64 drives a single belt that interconnects all three of the scan entry, scan exit and loading conveyors 54, 56, 58.

The scanning station 70 optionally includes a housing 72 that may act as a measuring gauge or a limiting device to limit the size of the items being processed. For instance, as described above, the scanning station may have a housing that surrounds the scanning area 75. Specifically, the housing may have one or more walls forming an enclosure. For example, the housing may include a front wall extending vertically along the front edge of the scanning station and a rear wall extending vertically along the rear edge of the scanning station. The rear wall may also separate the scanning area 75 from a return conveyor 400, which is described further below. A top wall may extend between the top edges of the front wall and the rear wall of the housing. Additionally, the left side of the housing may include a wall connecting the front and rear walls as shown in FIG. 1. The left wall may include an opening sized to receive the maximum height of items to be processed by the machine. In this way, the entry opening may have a height that limits or impedes the entry of items having a height that exceeds the height threshold into the housing items so that items that are physically too large to be processed cannot be fed into the system through the induction station.

Additionally, the housing may be configured to act as a shielding element to shield items outside of the housing 72 from being scanned by the RFID readers 80, 81, 82. Specifically, the walls of the housing may be formed of a material that is electrically conductive. In the present instance, a conductive material is a material having a conductance equal to or greater than $1 \times 10^4$ siemens/meter. Conversely, a non-conductive material is a material having a conductance less than $1 \times 10^4$ siemens/meter. In this way, the walls will shield the RFID readers 80, 81, 82 to limit the readers from reading RFID tags on items on the input conveyor 52, the return conveyor 400, or on vehicles 200 that are operating in the sorting area. Additionally, the housing may include a right wall similar to the left wall having a discharge opening similar to the entry opening in the left wall. The discharge opening may be sized so that items can be discharged from the discharge conveyor onto the vehicle in the loading area. The right wall may also be conductive similar to the left wall so that the right wall limits the ability of the readers 80, 81, 82 to read RFID tags on items that are loaded on the vehicles 200 in the loading column.

Although the scanning housing is described as shielding that surrounds the scan area, it should be understood that the amount of shielding may be varied depending on the application. For instance, the housing may include the rear wall to shield items on the return conveyor 400 from the RFID scanners 80, 81, 82 but the housing may not include the front wall. Additionally, it should be understood that in some applications the shielding provided by the housing may be unnecessary. Accordingly, it should be understood that the amount and extent of shielding material may be modified or eliminated depending on the application.

Figure 5:
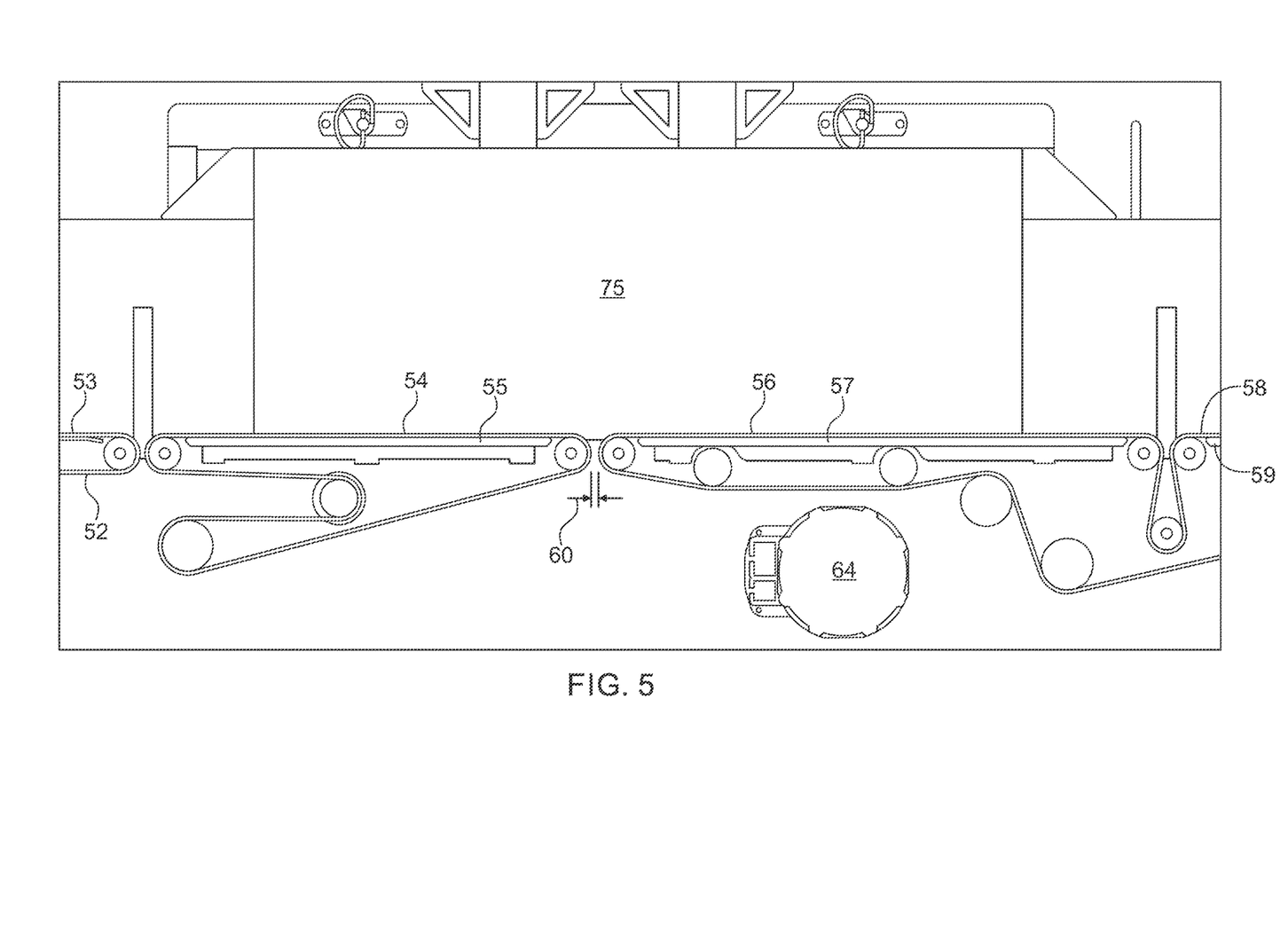
FIG. 5 is an enlarged fragmentary side view of the material handling apparatus illustrated in FIG. 4.
Figure 6:
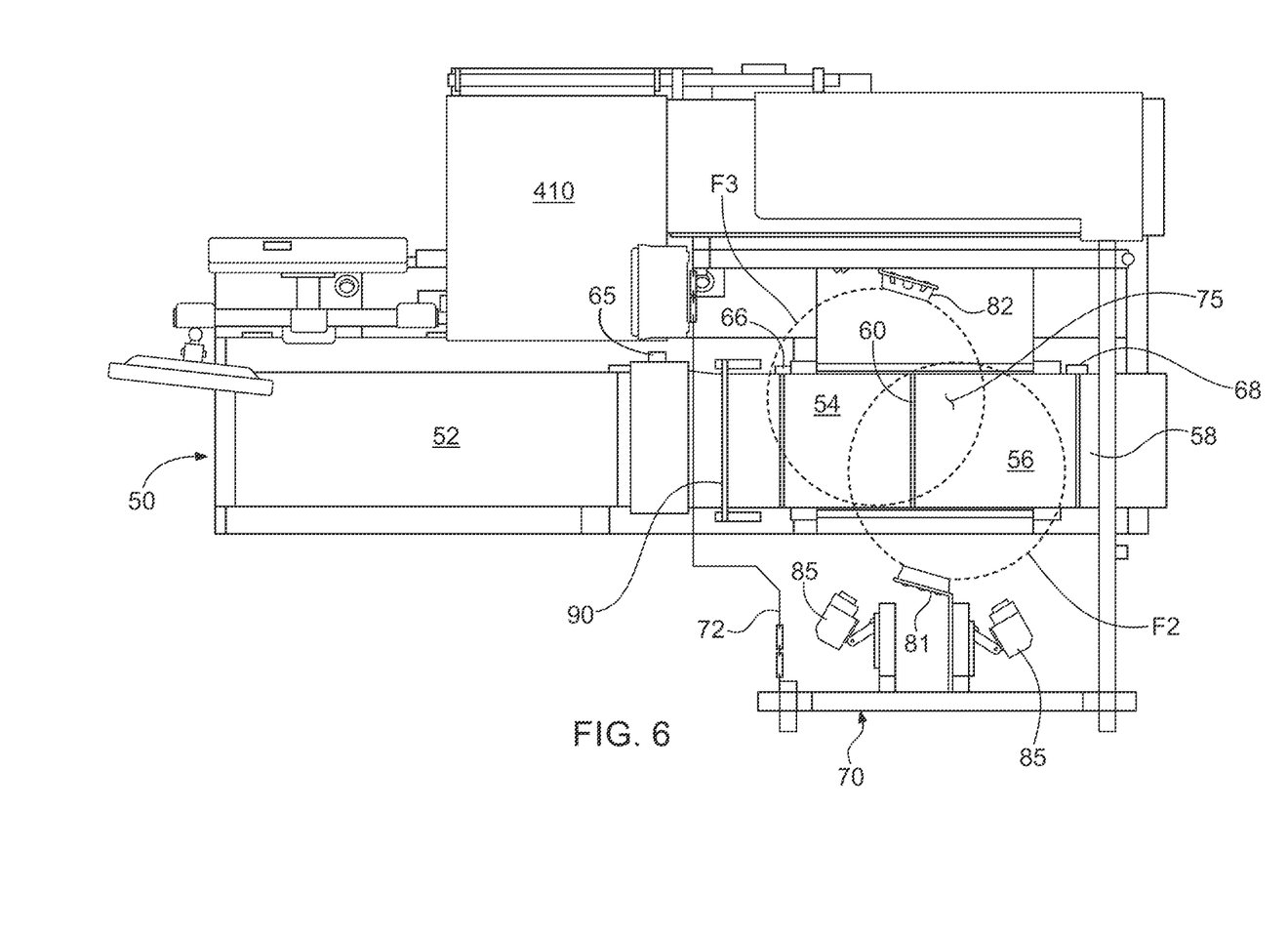
FIG. 6 is an enlarged fragmentary sectional view of the material handling apparatus illustrated in FIG. 5.

Referring to FIGS. 4-5, the input conveyor comprises a horizontally extending support element 53 that supports a length of the conveyor belt to form a horizontal support surface for supporting items conveyed by the input conveyor. Similarly, the scan entry conveyor 54 comprises a horizontally extending support element 55 that supports a length of the conveyor belt to form a horizontal support surface for supporting items conveyed by the scan entry conveyor. Additionally, the scan exit conveyor 56 comprises a horizontally extending support element 57 that supports a length of the conveyor belt to form a horizontal support surface for supporting items conveyed by the scan exit conveyor. Further, the loading conveyor 58 may also comprise a horizontally extending support element 59 that supports a length of the conveyor belt to form a horizontal support surface for supporting items conveyed by the loading conveyor. The support elements 53, 55, 57, 59 may be any of a variety of elements configured to support the horizontal conveyor belts. For instance, the support elements may be plates or similar flat guides.

The conveyors in the induction station 50 may be configured to improve the ability of the RFID reader to read RFID tags on items while the items are in the scan area 75, while minimizing the likelihood of the RFID readers reading RFID tags on items that are outside the scan area. For instance, the conveyor belts 52, 54, 56, 58 may be formed of materials that are electrically non-conductive. Additionally, the support elements for the conveyor(s) in the scan area may be formed of a material that is electrically non-conductive. For instance, support elements 55 and 57 may be formed of electrically non-conductive materials. An exemplary material is ultrahigh molecular weight (UHMW) polyethylene or Delrin. Although the support elements outside of the area may be configured of any of a variety of materials, including conductive and non-conductive materials, in the present instance, the support elements 53, 59 for the input conveyor 52 and the loading conveyor 58 are formed of a conductive material, such as metal. In this way, as the items are conveyed along the induction station, the items are supported by an electrically conductive element when the items are outside the scan area 75 and the items are supported by an electrically non-conductive element, or not supported by any element, while the item are conveyed in the scan area.

The system may include a plurality of sensors for controlling the flow of items through the induction station. For instance, the system may include a first sensor 65 upstream from the housing 72. The system may also include a second sensor 66 adjacent the entry to scanning station. Additionally, the system may include a third sensor 68 within or downstream from the scanning area 75. The sensors provide signals for controlling the flow of items through the induction station. The sensors may be any of a variety of sensors. For instance, the sensors may be I/R sensors having a transmitter on the front side of the conveyor and a receiver on the rear side of the conveyor so that the sensor provides a beam across the width of the conveyor. Alternatively, the sensors may be reflective sensors providing a detection plan extending across the width of the conveyor.

When the first sensor detects the leading edge of an item, the sensors provide a signal to the central controller 350 indicating that an item is positioned adjacent the entrance to the scanning station. The central controller provides signals to the first motor 62 to stop the input conveyor if there is an item within the scanning station. In this way, items are staged outside of the scanning station to ensure that only a single item is in the scan area at the time. The second sensor adjacent the exit conveyor detects the leading edge and the trailing edge of the item as the item passes the second sensor. In response to the signals from the second sensor, the central controller 350 controls the operation of the scan entry, scan exit, and loading conveyors. Specifically, the second motor runs for a pre-determined time once the trailing edge of an item passes the second sensor to ensure that the item is loaded onto the vehicle 200 waiting at the loading station. Once the item has cleared from the scan area, the central controller provides a signal to drive the first motor to convey the item from the staging point outside the scanning station toward the scanning area.

As described above, the scanning station 70 may be configured to analyze each item to detect various characteristics of the items as the items pass through the induction station. The system may make a qualification decision based on one or more of the characteristics detected or determined by the system. If the item is not qualified for sorting, then the item may be directed to the reject area 325 to await further processing.

Typically, items that are directed to the reject area 325 are subsequently processed manually. An operator takes each piece, identifies the piece and transports the item to the appropriate destination. Since the manual processing of rejected items is time-consuming and labor intensive, it is desirable to reduce the number of items directed to the reject area. Many of the items directed to the reject area 325 may simply have been mis-scanned. Although the items cannot be sorted without sufficient identification information, it may be possible to read the necessary information during a subsequent scan.

Since it may be desirable to re-process some non-qualified items, the information detected during the qualification can be used to identify different categories of non-qualified items. A first type of non-qualified item is a reject item that is directed to the reject area. In the following discussion, these items will be referred to as rejected items. A second type of non-qualified item is one that is not qualified for sorting but is qualified to be re-processed. In the following discussion, these items will be referred to as reprocess items.

The decision on whether an item is tagged as reject, reprocess or sort can be made based on a variety of characteristics. In the present instance, the decision to tag an item as a reject is based on a physical characteristic of the item. Specifically, if an item fails to qualify due to a physical characteristic (e.g., has a linear dimension such as height, width or length that exceeds a threshold), the system electronically tags the item as rejected and the item is directed to the reject area 325 for manual processing. Similarly, if the scanning station includes a scale, an item is tagged as rejected if the weight exceeds a weight threshold. On the other hand, if an item passes qualification based on the physical characteristics but fails due to an inability to identify a product identification element, then the element is electronically tagged as reprocess so that the item can be reprocessed to attempt to read the product identification information. For instance, depending on the orientation of the product, the imaging elements 85 may have been unable to properly read a bar code or other identifying mark. However, since the scanning station has determined that the item meets the physical parameters for processing the item, the system may transport the item to an alternate output, such as a bin for receiving items to be re-processed. Items sorted or transported to the re-processing bin may be manually returned to the induction station 50 so that the operator can input the items anew. Alternatively, the system may transport such items through the system to a re-induction assembly, such as conveyor 400, that returns the item to the entry conveyor 52 of the induction station 50.

As can be seen from the foregoing, the induction station 50 may be configured in a wide range of options. The options are not limited to those configurations described above and may include additional features.

Additionally, in the foregoing description, the system is described as having a single induction station 50. However, it may be desirable to incorporate a plurality of induction stations positioned along the system 10. By using a plurality of induction stations, the feed rate of pieces may be increased. In addition, the induction stations may be configured to process different types of items.

Referring to FIGS. 1-3, the induction station 50 includes a conveyor that serially conveys items to a loading station 165. The loading station is a location along the track 110 that provides an entry point for loading an item onto a vehicle 200. At the loading station 165 the vehicle is aligned with the conveyor so that items discharged from the conveyor are received onto the delivery vehicle 200 positioned at the loading station. After the item is loaded onto the delivery vehicle, the delivery vehicle moves away from the loading station 165 if the item is electronically tagged as being qualified for transport. Another vehicle then moves into position at the loading station to receive the next item. If the item is not electronically tagged as being qualified for transport, the item is discharged from the vehicle 200 into the reject bin 325.

The reject bin 325 is positioned so that it opposes the conveyor of the induction station 50. Additionally, the reject bin 325 is aligned with the vehicle 200 waiting at the loading station 165. In this way, a clear pathway is provided from the induction station 50 to the reject bin 325 without requiring movement of the vehicle along the track 110.

Re-Induction Assembly

The system may include an optional re-induction conveyor for items that were qualified for transport but not qualified for sorting. Referring to FIGS. 1-3, items that are qualified for transport may be transported away from the loading station 165 to either a re-induction conveyor or to the sorting station 100. Specifically, a vehicle carrying an item qualified for transport moves upwardly along the track 110 to the upper rail 135. If the item on the vehicle is tagged as re-assess, then the vehicle drives along the track to the re-induction conveyor. The vehicle 200 then discharges the item onto the re-induction conveyor 400, which conveys the item back toward the induction conveyor so that the item can be re-processed through the induction assembly in an attempt to qualify the item for sorting.

The re-induction assembly 400 comprises a pathway between the track and the induction station 50 to facilitate return of re-assess items to the induction station. The re-induction assembly 400 may comprise any of a number of conveyance mechanisms. The mechanisms can be driven or static, motorized or un-motorized.

Sorting Station

Items that are qualified for sorting by the induction station 50 are conveyed by vehicles to the sorting station. Referring to FIGS. 1-2, the system includes a sorting station 100, such as an array of bins 45 for receiving the pieces.

The track 110 includes a horizontal upper rail 135 and a horizontal lower rail 140. A plurality of vertical legs 130 extend between the upper horizontal leg and the lower horizontal leg 140. During transport, the vehicles travel up a pair of vertical legs from the loading station 165 to the upper rail 135. The vehicle then travels along the upper rail until reaching the column having the appropriate bin or destination. The vehicle then travels downwardly along two front vertical posts and two parallel rear posts until reaching the appropriate bin or destination, and then discharges the item into the bin or destination area. The vehicle then continues down the vertical legs until reaching the lower horizontal leg 140. The vehicle then follows the lower rail back toward the loading station.

The track 110 includes a front track 115 and a rear track 120. The front and rear tracks 115, 120 are parallel tracks that cooperate to guide the vehicles around the track. As shown in FIGS. 2-3 each of the vehicles includes four wheels 220: two forward wheels and two rearward wheels. The forward wheels ride in the front track, while the rearward wheels ride in the rear track. It should be understood that in the discussion of the track, the front and rear tracks 115, 120 are similarly configured opposing tracks that support the forward and rearward wheels of the vehicles. Accordingly, a description of a portion of either the front or rear track also applies to the opposing front or rear track.

Referring now to FIGS. 1-3 a loading column 160 is formed adjacent the output end of the induction station 50. The loading column 160 is formed of a front pair of vertical rails 130 and a corresponding rearward set of vertical rails. The loading station 165 is positioned along the loading column. The loading station 165 is the position along the track in which the vehicle 200 is aligned with the discharge end of the loading conveyor 58 of the induction station 50. In this way, an item from the induction station may be loaded onto the vehicle as it is conveyed toward the vehicle from the input station.

The details of the track may be substantially similar to the track as described in U.S. Pat. No. 7,861,844. The entire disclosure of U.S. Pat. No. 7,861,844 is hereby incorporated herein by reference.

As described above and referring to FIG. 2, the track includes a plurality of vertical legs extending between the horizontal upper and lower rails 135, 140. An intersection is formed at each section of the track at which one of the vertical legs intersects one of the horizontal legs. Each intersection includes a pivotable gate that has a smooth curved inner race and a flat outer race that has teeth that correspond to the teeth of the drive surface for the track. The gate pivots between a first position and a second position. In the first position, the gate is closed so that the straight outer race of the gate is aligned with the straight outer branch of the intersection. In the second position, the gate is open so that the curved inner race of the gate is aligned with the curved branch of the intersection.

In the foregoing description, the sorting station 100 is described as a plurality of output bins 45. However, it should be understood that the system may include a variety of types of destinations, not simply output bins. For instance, in certain applications it may be desirable to sort items to a storage area, such as an area on a storage shelf. Alternatively, the destination may be an output device that conveys items to other locations.

As discussed above, the system is operable to sort a variety of items to a plurality of destinations. One type of destination is a bin; a second type is a shelf or other location on which the item is to be stored; and a third type of destination is an output device that may be used to convey the item to a different location. The system may include one or more of each of these types or other types of destinations.

Delivery Vehicles

Each delivery vehicle 200 is a semi-autonomous vehicle having an onboard drive system, including an onboard power supply. Each vehicle includes a mechanism for loading and unloading items for delivery. An embodiment of a vehicle that may operate with the system 10 is illustrated and described in U.S. Pat. No. 7,861,844, which is incorporated herein by reference.

The vehicle 200 may incorporate any of a variety of mechanisms for loading an item onto the vehicle and discharging the item from the vehicle into one of the bins. Additionally, the loading/unloading mechanism 210 may be specifically tailored for a particular application. However, in the present instance, the loading/unloading mechanism 210 is one or more conveyor belts that extend along the top surface of the vehicle. The conveyor belts are reversible. Driving the belts in a first direction displaces the item toward the rearward end of the vehicle; driving the belt in a second direction displaces the item toward the forward end of the vehicle.

A conveyor motor mounted on the underside of the vehicle drives the conveyor belts 212. Specifically, the conveyor belts 212 are entrained around a forward roller at the forward edge of the vehicle, and a rearward roller at the rearward edge of the vehicle. The conveyor motor is connected with the forward roller to drive the forward roller, thereby operating the conveyor belts.

The vehicle includes four wheels that are used to transport the vehicle along the track 110. The wheels are mounted onto two parallel spaced apart axles, so that two or the wheels are disposed along the forward edge of the vehicle and two of the wheels are disposed along the rearward edge of the vehicle.

Each wheel may comprise an outer gear that cooperates with the drive surface of the track. The outer gear is fixed relative to the axle onto which it is mounted. In this way, rotating the axle operates to rotate the gear. Accordingly, when the vehicle is moving vertically the gears cooperate with the drive surface of the track to drive the vehicle along the track.

The vehicle includes an onboard motor for driving the wheels. More specifically, the drive motor is operatively connected with the axles to rotate the axles, which in turn rotates the gears of the wheels.

The vehicle 200 may be powered by an external power supply, such as a contact along the rail that provides the electric power needed to drive the vehicle. However, in the present instance, the vehicle includes an onboard power source that provides the requisite power for both the drive motor and the conveyor motor. Additionally, in the present instance, the power supply is rechargeable. Although the power supply may include a power source, such as a rechargeable battery, in the present instance, the power supply is made up of one or more ultracapacitors.

As discussed further below, the vehicle further includes a processor for controlling the operation of the vehicle in response to signals received from the central processor. Additionally, the vehicle includes a wireless transceiver so that the vehicle can continuously communicate with the central processor as it travels along the track. Alternatively, in some applications, it may be desirable to incorporate a plurality of sensors or indicators positioned along the track. The vehicle may include a reader for sensing the sensor signals and/or the indicators, as well as a central processor for controlling the operation of the vehicle in response to the sensors or indicators.

Operation

The system 10 operates as follows. An item is processed at the induction station 50 to identify a characteristic of the item that is indicative of where the piece should be sorted. As described previously, the item may also be processed to determine whether the item is qualified to be transported by one of the vehicles based on physical characteristics of the item. The central controller maintains data that correlates various data to identify the destination bin or location for the items being processed.

As discussed previously, the induction station 50 may process the items automatically or manually before loading the items onto vehicles. In a manual mode, the operator manually enters information regarding a piece and then drops the piece on a conveyor. The system electronically tags the piece with the sort information and the conveyor conveys the piece toward the loading station. Alternatively, if the input system is an automated system, the piece is automatically scanned to identify the relevant sort characteristic. For instance, the input station may use a scanner, such as an RFID scanner to read the RFID tag on a piece and optionally, the input station may also include an imaging device, such as a high-speed line scan camera in combination with an OCR engine to read information on the piece.

The method for loading the items onto the vehicles 200 may include the step of monitoring the items as they are conveyed toward the vehicles. For instance, the step of monitoring may include the step of detecting the items at one or more location as the items are conveyed toward a loading station 165.

In the present instance, the items are monitored at a plurality of locations as the items are conveyed from an input location 51 to the loading station 165. The items are monitored using one or more sensors, such as infrared detectors that extend across the width of the path that the items are conveyed along. Each sensor may send a signal to the central controller indicative of an item being present at the sensor. In this way, based on the signals the central controller 350 receives from the sensors, the central controller can determine when the leading edge of an item passes the sensor and when the trailing edge of the item passes the sensor.

The central controller may control the movement of the items along the path from the input location to the loading station based on the signals received from the sensors 65, 66, 68. In particular, the central controller may control the rate at which items are advanced along the induction station based on the signals received from the sensors.

The method may also include the step of selectively staging the items at one or more locations along the path from the input location 51 to the loading location 165. For instance, the exit sensor 68 may detect the leading edge of an item as it is conveyed along the input path. If an empty vehicle 200 is not positioned in the loading location 165, the item will be staged adjacent the loading location while the system waits for an empty vehicle to arrive at the loading location. For example, the system may stop loading conveyor 58 after detecting the item at the exit sensor 68 if the vehicle is not positioned at the loading location.

The method may also include the step of controlling the movement of an item through the scanning area 75 based on signals received from one or more of the sensors 65, 66, 68. For instance, the central controller 350 may control the operation of the conveyor(s) 54, 56 in the scanning area based on signals received from the sensors 66, 68.

The conveyors may be controlled to stage an item adjacent to the scanning station 70. For example, the system may stop one or more conveyors to stop an item adjacent the entry to the scanning station so that the item does not enter the scanning area 75 while another item is in the scanning area. In one methodology, the controller may stage the item adjacent the entrance to the scanning station in response to signals received from the entry sensor 66 and the exit sensor 68. For example, in a sequence of two items, if the leading item has passed the entry sensor 66 but has not passed the exit sensor 68, the central controller will control one or more of the conveyors to ensure that the trailing item does not enter the scanning area until a predetermined time after the leading item passes the exit sensor.

The predetermined time may be based upon the exit sensor detecting the leading edge or the trailing edge of the leading item. For instance, the trailing item may not be advanced into the scanning area 75 until a predetermined time after the exit sensor 68 detects the leading edge of the leading item. Alternatively, the trailing item may not be advanced into the scanning area 75 until a predetermined time after the exit sensor detects the trailing edge of the leading item.

In addition to controlling the staging of items based on signals from the exit sensor 68, the central controller 350 may control the operation of the items based on the signals received from the input sensor 65 or the entry sensor 66. For instance, upon receiving a signal from the entry sensor 66 indicating that the trailing item is present at the entry sensor, the controller may stage the item along the induction path upstream from the scanning area 75 until receiving a signal from the exit sensor indicating that the leading item has advanced out of the scanning area. Additionally, the trailing item may be staged along the induction path until the leading item has advanced out of the scanning station 70.

The controller may control the trailing item to stage the item along the induction path based on signals received from the input sensor 65. For instance, once the central processor 350 receives a signal from the input sensor indicative of an item being at the input sensor, the central controller 350 may control the movement of the item along the induction path to stage the item adjacent the entrance to the entrance to the scanning housing if the leading item has not cleared the exit sensor 68, as described above. The central controller 350 can stage the trailing item by advancing the item a certain time or distance after detecting the leading edge of the item or alternatively after detecting the trailing edge of the item.

In view of the foregoing, a method for processing items may include the step of feeding items onto a conveyor to follow an induction path that that extends between the input location 51 and the loading location 165. The process may include feeding a first item having a first passive RFID tag onto the conveyor and conveying the first item into the scanning station 70 to scan the first item.

The step of conveying the first item into the scanning station 70 may optionally include the step of advancing the first item into a conductive housing having one or more walls adjacent the conveyor and one or more RFID readers 80, 81, 82. For instance, the conductive housing may have a first conductive wall 73A extending upwardly across the induction path adjacent the entrance to the scanning station 70. An opening may be formed between the first wall 73A and the induction conveyor to form an opening through which the items pass into the scanning area 75. Optionally, the conductive housing 72 may include a second conductive wall 73B extending upwardly across the induction path adjacent the exit to the scanning station 70. An opening may be formed between the second conductive wall and the induction conveyor through which the items pass out of the scanning area 75. The housing 72 may optionally include a front wall 74A extending upwardly and spanning the distance between the first wall 73A and the second wall 73B. The front wall may extend vertically above one or more of the RFID readers 80. Additionally, the housing may include a rear wall 74B opposing the front wall 74A and extending upwardly and spanning the distance between the first wall 73A and the second wall 73B. The rear wall 74B may extend vertically above one or more of the RFID readers 80 to provide a conductive wall between the scanning area 75 and items on the return conveyor 400.

The step of scanning may include the step of conveying the first item along the induction path through a scanning area 75 while scanning the first item using an RFID reader.

Optionally, the step of scanning may include the step of scanning the first item while supporting the item by a non-conductive conveyor having a non-conductive support. For instance, the step of scanning may include the step of emitting a radio frequency signal toward the RFID tag on the first item while the item is supported on a non-conductive conveyor that includes a generally planar non-conductive support.

The step of scanning the first item may include the step of emitting a radio frequency signal toward one or more conductive walls separating the first item from one or more items on the induction path. Optionally, the step of scanning the first item may include the step of emitting a radio frequency signal toward one or more of the conductive walls separating the first item from one or more items carried on the delivery vehicles 200.

The method may also include the step of feeding a second item having a second RFID tag onto the conveyor to follow the induction path. After the first item enters the scanning station, the conveyor may advance the second item to a location adjacent the scanning station. For instance, a central controller 350 may control the induction conveyor to stage the second item at the entrance so that at least part of the second item remains outside the housing 72 while the first item is within the housing.

After the step of scanning the first item, the method may include the step of scanning the second item. The step of scanning the second item may optionally include the step of controlling the timing of emitting the radio frequency signal until after the first item is conveyed out of the housing.

After conveying the first item out of the housing, the first item may be loaded onto one of the vehicles 200 at the loading station.

To prepare to receive an item, a vehicle 200 moves along the track toward the loading station 165 in the loading column 160. When the vehicle 200 moves into position at the loading station 165 the home sensor detects the presence of the vehicle and sends a signal to the central processor 350 indicating that the vehicle is positioned at the loading station.

Once the vehicle is positioned at the loading station, the input station conveys an item onto the vehicle. As the item is being conveyed onto the vehicle 200, the loading mechanism on the vehicle loads the item onto the vehicle. Specifically, the input station conveys the item into contact with the conveyor belts 212 on the vehicle. The conveyor belts 212 rotate toward the rearward side of the vehicle, thereby driving the item rearwardly on the vehicle.

After an item is loaded onto the vehicle, the vehicle moves away from the loading station. Specifically, once the onboard controller detects that an item is properly loaded onto the vehicle, the onboard controller sends a signal to start the drive motor.

The vehicle may drive from the loading location 165 to one of the bins 45 and then transfer the first item into the first bin 45. After delivering the first item to the first bin, the vehicle may return to the loading location 165 to receive another item for delivery.

Although the bins may be arranged into any of a variety of configurations, in the present instance the bins are arranged in one or more arrays disposed along an aisle in which the vehicles travel. The step of delivering the first item may include the step of driving the vehicle 200 along a vertical loop to deliver the first item and then return to the loading location.

Optionally, the vertical loop may include a first vertical segment leading upwardly within the aisle, a horizontal segment extending horizontally within the aisle away from the first vertical segment, a second vertical segment within the aisle extending away from the end of the first horizontal segment and a second horizontal segment within the aisle extending away from the second vertical segment.

Since the vehicles move up the loading column from the loading station, the destination for the vehicle does not need to be determined until after the vehicle reaches the first gate along the upper rail 135. For instance, if an automated system is used at the induction station 50 to scan and determine the characteristic used to sort the items, it may take some processing time to determine the relevant characteristic and/or communicate that information with a central controller to receive destination information. The time that it takes to convey the item onto the vehicle and then convey the vehicle up the loading column will typically be sufficient time to determine the relevant characteristic for the item. However, if the characteristic is not determined by the time the vehicle reaches the upper rail, the system may declare that the item is not qualified for sorting and the vehicle may be directed to the re-induction station 400 to discharge the item onto the discharge assembly. From the re-induction station 400, the vehicle travels down the second column to the lower rail 140, and then back to the loading column.

Once the item is qualified for sorting, the central controller 350 determines the appropriate bin 45 for the item. Based on the location of the bin for the item, the route for the vehicle 200 is determined. Specifically, the central controller determines the route for the vehicle and communicates information to the vehicle regarding the bin into which the item is to be delivered. The central controller then controls the vehicle and/or gates along the track to direct the vehicle to the appropriate column. Once the vehicle reaches the appropriate column the vehicle moves down the column to the appropriate bin. The vehicle stops at the appropriate bin 45 and the onboard controller sends an appropriate signal to the conveyor motor to drive the conveyor belts 212, which drives the item forwardly to discharge the item into the bin. Specifically, the top of the vehicle aligns with the gap between the appropriate bin 45 and the bottom edge of the bin that is immediately above the appropriate bin.

It will be recognized by those skilled in the art that changes or modifications may be made to the above-described embodiments without departing from the broad inventive concepts of the invention. For instance, in the foregoing discussion the system is described as a series of vehicles guided by a track. However, it should be understood that the system need not include a track. For example, the vehicles may travel along the ground rather than traveling along a track. The vehicles may be guided along the ground by one or more sensors and/or a controller. Optionally, the vehicles may be guided in response to signals from other vehicles and/or from a central controller, such as a computer that monitors each of the vehicles and controls movement of the vehicles to prevent the vehicles from colliding with one another. Additionally, the central controller may provide signals to direct each vehicle along a path to a storage location or transfer location.

In addition to a system in which the vehicles move along the ground without a track, the system may incorporate a guidance assembly that includes one or more rails or other physical guides that contact a mechanism on the vehicle to direct the vehicle along a path. For instance, the vehicles may each include one or more contact elements such as wheels, rollers, guide tabs, pins or other elements that may engage the guidance assembly. The guidance assembly may be a linear element such as a straight rail or it may be a curved element. The guidance assembly may curve within a horizontal plane so that the rail stays within a plane, or the guide may curve vertically so that the rail is within a single plane. The guidance assembly may include a plurality of guides or rails vertically spaced from one another so that the vehicles may move horizontally at a plurality of vertical levels. The guide may also include an elevator for moving the vehicles between the vertically spaced rails.

As can be seen from the above, the system may be incorporated into a variety of systems that use physical guide mechanisms to guide the vehicles along open areas by directing the path to guide the vehicles to storage locations or transfer locations. As discussed above, the movement of each vehicle may be controlled in response to a determination of one or more physical characteristics of the item carried by each respective vehicle.

Additionally, although the foregoing discussion describes the delivery mechanism as one or more vehicles, it should be understood that a variety of delivery mechanism can be used to deliver items from the induction station to a destination or storage location. For instance, the delivery mechanism may include a moveable arm, crane, shuttle, or other delivery vehicle.

In view of the foregoing, the system may include a method or apparatus having a combination of one of more of the features described below.

The system may include an input station having a conveyor and a scanning station. The conveyor may include an input segment for receiving items, a scanning segment for receiving items from the input segment and an output segment for receiving items from the scanning segment. The scanning segment may include a non-conductive element for supporting items on the scanning section.

The scanning station may be configured to scan items on the scanning segment of the conveyor. Optionally, the scanning station may include one or more conductive walls along the scanning segment and an RFID scanner.

The system may also include a delivery mechanism for receiving one of the items from the output segment of the conveyor and delivering the item to a storage location. Optionally, the system also includes a central controller operable to receive information from the scanning station regarding an identification for the item scanned in the scanning station. Based on the scanned information, the central controller may be configured to determine the storage location for the item. Optionally, the central controller provides controls signals to the delivery mechanism to deliver the item to the determined storage location.

The system may also optionally include a first plurality of storage locations separated from a second plurality of storage locations by an aisle. The delivery mechanism may be configured to move within the aisle. The delivery mechanism may include one or more vehicle, shuttle, crane, or moveable arm, each of which may be displaceable within the aisle to deliver the one item.

In certain application, the delivery mechanism may be a delivery vehicle that is displaceable vertically and horizontally within the aisle. Optionally, as discussed above, the delivery mechanism may include a plurality of delivery vehicles displaceable within the aisle. Additionally, the plurality of vehicles may be simultaneously displaceable along separate paths to different delivery locations. Optionally, the separate paths may be within the aisle.

The system may include a housing that includes a plurality of conductive walls adjacent a scanning area. The housing may include a first conductive wall extending across substantially the entire width of the conveyor. Optionally, the first conductive wall may be configured to allow the conveyor to convey items from the input area to the scanning area.

The housing may optionally include a second conductive wall extending across substantially the entire width of the conveyor. The second conductive wall may be configured to allow the conveyor to convey items from the scanning area to the output area.

The system may include a conveyor having a scanning segment adjacent an RFID scanner. The scanning segment may include a first conveyor belt and a non-conductive element in the form of one or more generally flat horizontal elements under the conveyor belt. Optionally, the generally flat horizontal elements may be a generally horizontal planar support supporting the underside of the conveyor belt.

As noted above, the system may include an RFID scanner directed into a conductive housing that extends along a scanning area to impede the RFID scanner from receiving RF signals from RFID tags outside of the scanning area. The RFID scanner may scan an item in the scanning area while the item is supported on a non-conductive element. The non-conductive element is optionally formed of material having a conductivity less than 10,000 Siemens per meter. Further, the non-conductive element is optionally formed of material having a conductivity less than 1,000 Siemens per meter. In some embodiments, the non-conductive element is optionally formed of material having a conductivity less than 1 Siemens per meter. In an exemplary embodiment, the non-conductive element is optionally formed of plastic.

The system may include a conveyor segment in the scanning area supported by a non-conductive support. Additionally, the system may include an input segment that includes a conveyor belt and a conductive support under the conveyor belt for supporting items on the input segment. Similarly, the system may optionally include an output segment that includes a conveyor belt and a conductive segment under the conveyor for supporting items on the output segment.

The system may optionally include one or more sensor for controlling processing of the items as the items move through the system. For instance, the system may include a first sensor for detecting the presence of items on an input segment of a conveyor for conveying items past the RFID scanner. The central controller may be configured to receive signals from the first sensor and control the input segment in response to signals from the first sensor.

Optionally, the system may include a second sensor for detecting the presence of items on the conveyor, such as items in the scanning segment adjacent the RFID scanner. The central controller may be configured to receive signals from the second sensor and control the input segment in response to signals from the second sensor. Additionally, in certain applications, the central controller may be configured to control operation of the input segment and the scanning segment to stage an item outside the scanning area while a second item is in the scanning area. Optionally, the central controller may be configured to control operation of the input segment and the scanning segment in response to signals from the first sensor and the second sensor to stage the item so that at least part of the first item is positioned outside the housing.

The system may also include a third sensor positioned along the conveyor. The third sensor may be positioned to detect the presence of items on an output segment of the conveyor downstream from the scanning area. The system may be configured so that the central controller is configured to receive signals from the third sensor and control operation of the scanning segment and the output segment in response to the signals from the third sensor so that the entire length of an item is out of the scanning area before part of another item enters the scanning area.

The central controller may be configured to control operation of the RFID scanner to scan the scanning area during a time window. The time window may be determined based on signals received from one or more sensors along the conveyor. For instance, the start of the time window may be determined based on signals from a sensor adjacent the scanning area. Optionally, the end of the time window may be based on signals from a sensor downstream from the scanning area.

In yet another embodiment, the system may include a conveyor and a delivery mechanism for delivering items from the conveyor to a storage location. An RFID scanner may scan RFID tags on the items as the items are conveyed toward the delivery mechanism. The system may include a housing positioned along the conveyor. Optionally, the housing includes a first wall extending across a width of the conveyor and configured to allow items on the conveyor to pass from an input location to a scanning area. The first wall is preferably formed of a conductive material. The housing may include a second wall extending across the width of the conveyor and spaced apart from the first wall so that the scanning area is between the first wall and the second wall. Optionally, the second wall is configured to allow items on the conveyor to pass from the scanning area to a loading location. Preferably, the second wall is formed of a conductive material.

The conveyor of the system may be configured so that in the scanning area the item is supported on a moveable surface for moving the item through the scanning area. The system may include a fixed support surface for supporting the moveable surface. Preferably, the moveable surface and fixed support surface are formed from non-conductive materials.

In one embodiment, the system may include a conveyor having an input area configured so that an item in the input area is supported on the moveable surface and a fixed support surface supporting the moveable surface. The fixed support may be formed of any of a variety of materials, but preferably the support surface is formed of a conductive material, such as metal.

Similarly, the system may include a conveyor having an output area configured so that an item in the output area is supported on the moveable surface and a fixed support surface supporting the moveable surface. The fixed support may be formed of any of a variety of materials, but preferably the support surface is formed of a conductive material, such as metal.

The system may include a central controller configured to operate the RFID scanner to scan an item while the item is between the first and second conductive walls and the item is on the non-conductive fixed support.

According to another aspect, a method is provided for delivering items to one or more destinations. The method may include the steps of conveying a first item along a first conveyor section. From the first conveyor section, the item is conveyed past a first conductive wall and onto a second conveyor section. The first conductive wall separates the first conveyor section from a second conveyor section. When the item is conveyed past the first conductive wall, the item may be conveyed under the first wall or through an opening in the first conductive wall.

The method may include the step of emitting an RF signal toward an RFID tag on the first item on the second conveyor section while the first item is supported on a non-conductive support.

The method may also include the step of receiving an RF signal from the RFID tag on the first item while the first item is supported on the non-conductive support.

The method may further include the step of determining the destination for the first item based on the step of receiving the RF signal from the RFID tag.

The first item may be conveyed past a second conductive wall separating the second conveyor section from a third conveyor section. When the item is conveyed past the second conductive wall, the item may be conveyed under the second wall or through an opening in the second conductive wall.

The method may include the step of loading the item from the third conveyor section onto a delivery mechanism. The delivery mechanism may be displaced to deliver the item to the determined destination. After the delivery mechanism is displaced to the determined destination, the item may be discharged into the delivery destination.

Optionally, the step of conveying the item along a first conveyor section comprises supporting the item with a conductive support.

Optionally, the step of conveying the item along a third conveyor section downstream from the scanning area.

According to another aspect, the method includes the step of displacing the delivery mechanism within an aisle that is between a first plurality of destinations and a second plurality of destinations. Optionally, the step of moving the delivery mechanism within the aisle comprises moving the delivery mechanism horizontally and vertically within the aisle.

Optionally, the step of moving the delivery mechanism includes moving the delivery mechanism within the aisle along a vertical loop extending from a loading location to a determined destination and back to the loading location to pick up another item.

During the step of emitting an RF signal toward an RFID tag on an item, it may be desirable to support the item on a non-conductive conveyor belt that is supported by a generally planar non-conductive support engaging the underside of the conveyor belt. Optionally, during the step of emitting an RF signal toward the item, it may be desirable to simultaneously support a second item having a second RFID tag in an input section and a third RFID tag on a third item in a loading section. Optionally, during the step of emitting an RF signal, it may be desirable to simultaneously operate the delivery mechanism to deliver a fourth item having a fourth RFID tag.

The systems and methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

It should therefore be understood that this invention is not limited to the particular embodiments described herein but is intended to include all changes and modifications that are within the scope and spirit of the invention as set forth in the claims.

The invention claimed is:

1. A material handling apparatus, comprising:
an input station comprising:
   a conveyor having an input segment for receiving items, a scanning segment for receiving items from the input segment and an output segment for receiving items from the scanning segment, wherein the scanning segment comprises a non-conductive element for supporting items on the scanning section;
a scanning station for scanning items on the scanning segment of the conveyor, comprising:
   a housing having one or more conductive walls adjacent the scanning segment;
   an RFID scanner comprising an emitter for emitting a radio frequency signal toward one or more walls of the housing and toward the scanning segment of the conveyor and a receiver for receiving signals emitted from the emitter;
a delivery mechanism for receiving items from the output segment of the conveyor and delivering the items to a plurality of storage locations;

a central controller operable to receive information from the scanning station regarding an identification for each item and determining the storage location to which each of the items is to be delivered, wherein the delivery mechanism is configured to deliver each item to the storage location determined for each item, wherein the input segment comprises a second conveyor belt and a conductive support under the second conveyor belt for supporting items on the input segment; and wherein the output segment comprises a third conveyor belt and a conductive support under the third conveyor belt for supporting items on the output segment.

2. The apparatus of claim 1, wherein the plurality of storage locations comprises a first plurality of storage locations separated from a second plurality of storage locations by an aisle, wherein the delivery mechanism is configured to move within the aisle.

3. The apparatus of claim 2 wherein the delivery mechanism comprises a plurality of delivery vehicles that are displaceable vertically and horizontally within the aisle.

4. The apparatus of claim 1 wherein the housing comprises a plurality of conductive walls adjacent a scanning area along the scanning segment wherein the plurality of conductive walls comprises a first conductive wall extending across a width of the conveyor.

5. The apparatus of claim 4 wherein the plurality of conductive walls comprises a second conductive wall extending across a width of the conveyor adjacent the output segment.

6. The apparatus of claim 1 wherein the scanning segment comprises a first conveyor belt and the non-conductive element comprises one or more elements having a flat horizontal portion under the conveyor belt.

7. The apparatus of claim 6 wherein the one or more elements having a flat horizontal portion comprise a support having a planar portion supporting the underside of the conveyor belt.

8. The apparatus of claim 7 wherein the non-conductive element is formed of plastic.

9. The apparatus of claim 1 wherein the non-conductive element is formed of material having a conductivity less than 10,000 Siemens per meter.

10. A material handling apparatus for delivering a plurality of items to a plurality of storage locations, comprising:
a conveyor operable to convey a first of the items from an input location to a scanning area and then to a loading location;
a delivery mechanism operable to receive the first item from the conveyor at the loading location and deliver the first item to one of the storage locations;
an RFID scanner positioned adjacent the scanning area to scan items for RFID tags having identification information;
a housing positioned along the conveyor, comprising:
a first wall extending across a width of the conveyor and configured to allow items on the conveyor to pass from the input location to the scanning area wherein the first wall is formed of a conductive material;
a second wall extending across the width of the conveyor and spaced apart from the first wall so that the scanning area is between the first wall and the second wall, wherein the second wall is configured to allow items on the conveyor to pass from the scanning area to the loading location wherein the second wall is formed of a conductive material
wherein the conveyor comprises a moveable surface for moving the first item through the scanning area and a fixed support surface supporting the moveable surface wherein the moveable surface and fixed support surface are formed from non-conductive materials.

11. The apparatus of claim 10 wherein the conveyor comprises a second moveable surface configured to move items from the input area toward the scanning area and a second fixed support surface supporting the second moveable surface wherein the second fixed support surface is formed from conductive material.

12. The apparatus of claim 11 wherein the conveyor comprises a third moveable surface configured to move items from the scanning area toward the loading location and a third fixed support surface supporting the third moveable surface wherein the third fixed support surface is formed from conductive material.

13. The apparatus of claim 10 wherein a first plurality of the storage locations is separated from a second plurality of the storage locations by an aisle, wherein the delivery mechanism is configured to move within the aisle.

14. The apparatus of claim 13 wherein the delivery mechanism comprises a plurality of delivery vehicles displaceable vertically and horizontally within the aisle.

15. The apparatus of claim 10 wherein the moveable surface comprises a conveyor belt and the non-conductive fixed support surface comprises one or more elements having a flat portion extending horizontally under the conveyor belt.

16. The apparatus of claim 10 wherein the non-conductive fixed support surface is formed of plastic.

17. The apparatus of claim 10 comprising a central controller configured to control operation of the conveyor to impede movement of a first item past the first wall while a second item is between the first and second walls.

18. The apparatus of claim 17 wherein the central controller is configured to operate the RFID scanner to scan the second item while the second item is between the first and second conductive walls and the second item is on the non-conductive fixed support.

19. A method for delivering items to one or more destinations, comprising the steps of:
conveying a first item along a first conveyor section;
conveying the first item under a first conductive wall and onto a second conveyor section wherein the first conductive wall separates the first conveyor section from the second conveyor section;
emitting an RF signal toward an RFID tag on the first item on the second conveyor section while the first item is supported on a non-conductive support;
receiving an RF signal from the RFID tag on the first item while the first item is supported on the non-conductive support;
determining the destination for the first item based on the step of receiving the RF signal from the RFID tag;
conveying the first item under a second conductive wall separating the second conveyor section from a third conveyor section;
loading the first item from the third conveyor section onto a delivery mechanism;
displacing the delivery mechanism to deliver the first item to the determined destination; and
discharging the item from the delivery mechanism to the determined destination wherein the step of conveying the first item along a first conveyor section comprises supporting the first item with a conductive support.

20. The method of claim 19 wherein an aisle separates a first plurality of destinations from a second plurality of destinations and the step of displacing the delivery mechanism comprises moving the delivery mechanism within the aisle.

21. The method of claim 20 wherein the step of moving the delivery mechanism within the aisle comprises moving the delivery mechanism horizontally and vertically within the aisle.

22. The method of claim 20 wherein the step of moving the delivery mechanism comprises moving the delivery mechanism within the aisle along a vertical loop extending from the third conveyor section to the determined destination and back to the third conveyor section to pick up another item.

23. The method of claim 19 wherein the step of emitting an RF signal toward an RFID tag on the first item on the second conveyor section while the first item is supported on a non-conductive support comprises the step of emitting the RF signal while the first item is on a non-conductive conveyor belt that is supported by a non-conductive support having a planar portion engaging the underside of the conveyor belt.

24. The method of claim 19 wherein the step of receiving the RF signal from the RFID tag comprises receiving the RF signal while a second item having a second RFID tag is positioned on the input section and a third item having a third RFID tag on the loading section.

25. The method of claim 24 wherein the step of receiving the RF signal comprises receiving the RF signal while the delivery mechanism delivers a fourth item having a fourth RFID tag.

* * * * *